(12) United States Patent
D'Souza

(10) Patent No.: US 7,254,713 B2
(45) Date of Patent: Aug. 7, 2007

(54) DOS ATTACK MITIGATION USING UPSTREAM ROUTER SUGGESTED REMEDIES

(75) Inventor: Scott David D'Souza, Ottawa (CA)

(73) Assignee: Alcatel, Paris (FR)

( * ) Notice: Subject to any disclaimer, the term of this patent is extended or adjusted under 35 U.S.C. 154(b) by 630 days.

(21) Appl. No.: 10/659,341

(22) Filed: Sep. 11, 2003

(65) Prior Publication Data

US 2005/0060573 A1    Mar. 17, 2005

(51) Int. Cl.
  *G06F 1/24*   (2006.01)
(52) U.S. Cl. .................. 713/182; 713/164; 713/165; 713/166; 713/168
(58) Field of Classification Search ............... 713/182, 713/164, 165, 166, 168
  See application file for complete search history.

(56) References Cited

U.S. PATENT DOCUMENTS 5,802,371 A * 9/1998 Meier .................. 717/133
5,970,248 A * 10/1999 Meier .................. 717/125

FOREIGN PATENT DOCUMENTS

WO    WO 02/03653 A    1/2002
WO    WO 03/005665 A    1/2003

OTHER PUBLICATIONS

Mahajan, Ratul et al: "Controlling High Bandwidth Aggregates in the Network", Computer Communication Review, Association for Computing Machinery. New York, US, vol. 32, No. 3, Jul. 2002, pp. 62-73.
Smith, R. N. et al: "Operating firewalls outside the LAN perimeter", Performance, Computing and Communications Conference, 1999 IEEE International Scottsdale, AZ, USA, Feb. 1999, Piscataway, NJ, USA, IEEE, US, Feb. 10, 1999, pp. 493-498.
Mahajan, Ratul et al, "Controlling High Bandwidth Aggregates in the Network", AT&T Center for Internet Research at ICSI (ICIRI) and AT&T Labs Research, Jul. 13, 2001 (12 pages).

* cited by examiner

*Primary Examiner*—Thomas Peeso
(74) *Attorney, Agent, or Firm*—Jim Zegeer

(57) ABSTRACT

Systems and methods of mitigating DOS attacks on a victim node in a computer based communication system are presented. According to the methods a node such as a router upstream from the victim analyzes traffic flow directed to the victim node and if a pattern indicating a possible attack is detected a notification to the effect is sent to the victim node. The victim can either ignore the notification or chose to suggest or request attack mitigation measures be implemented by the upstream router. Alternatively the upstream router can implement attack mitigation measures without waiting for input from the victim node.

14 Claims, 2 Drawing Sheets

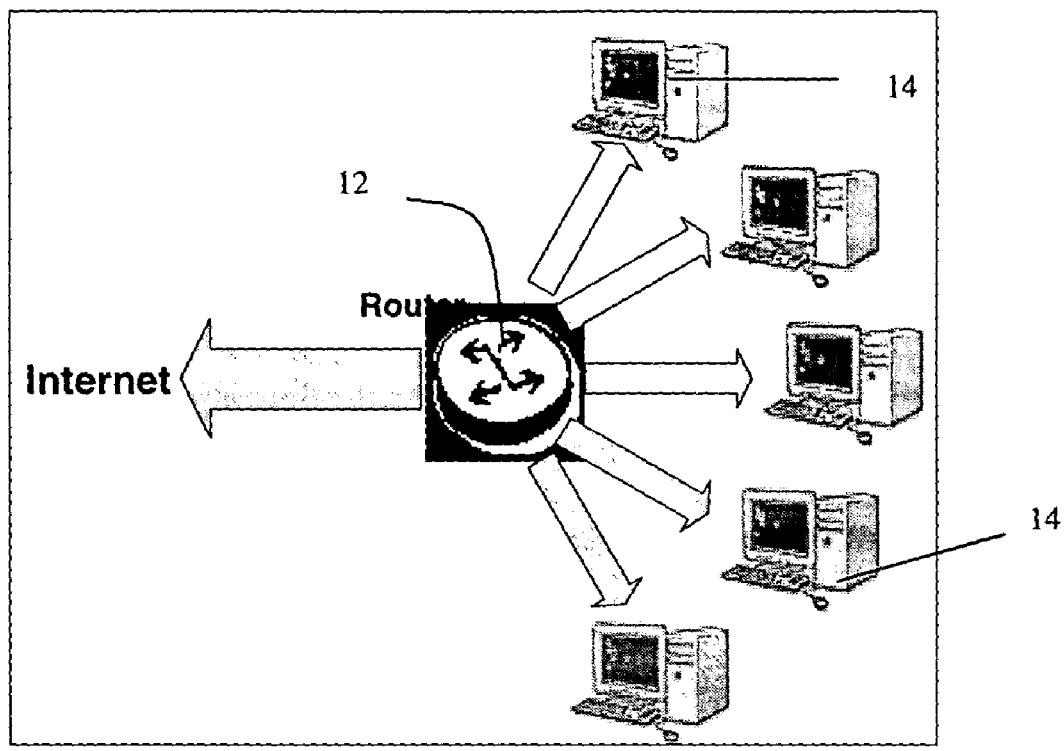
Figure 1: Typical Router Scenario
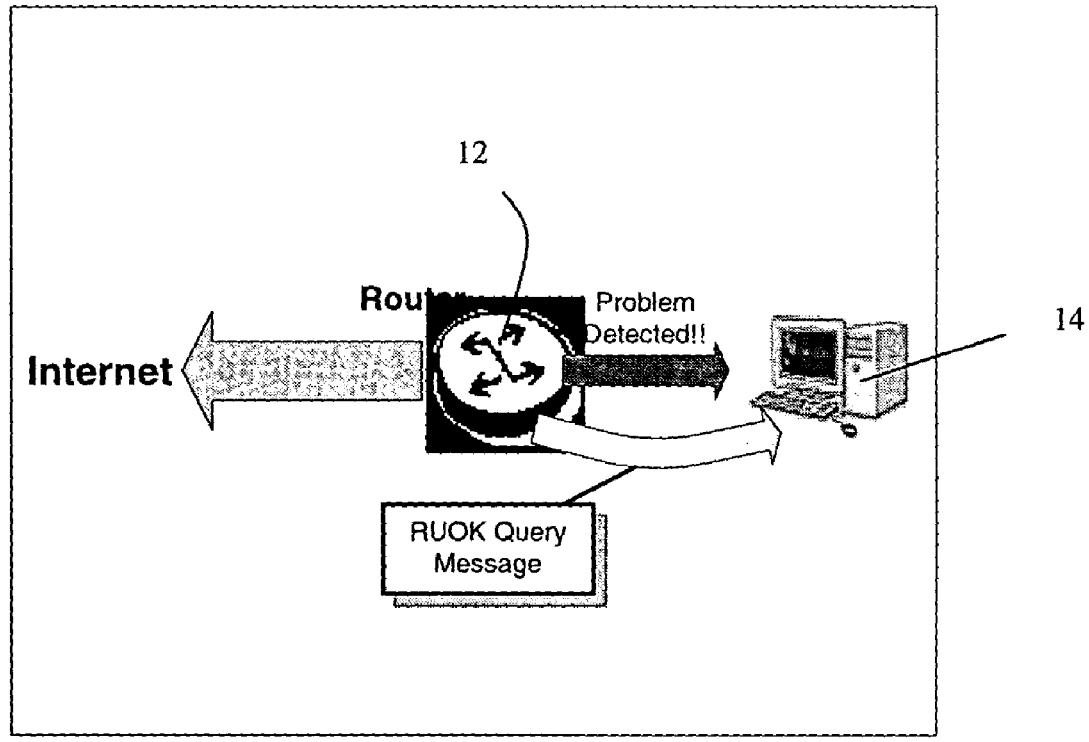
Figure 2: Attack Detected, RUOK Query

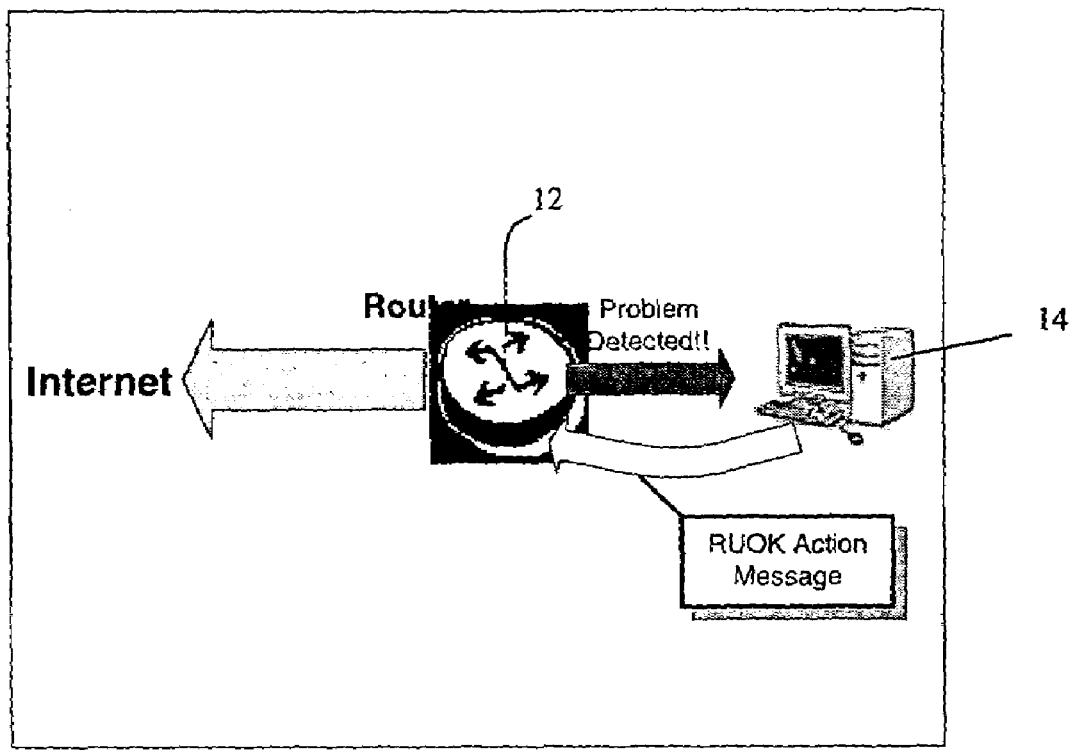
Figure 3: RUOK Action Message
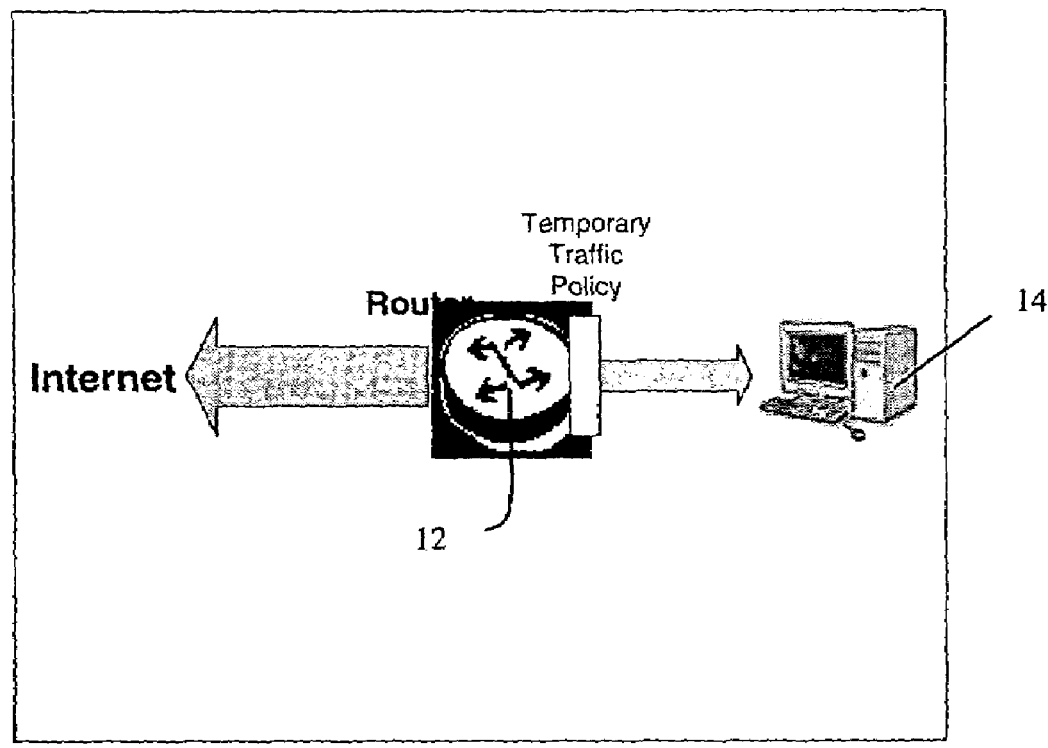
Figure 4: New Policy Implemented

DOS ATTACK MITIGATION USING UPSTREAM ROUTER SUGGESTED REMEDIES

FIELD OF THE INVENTION

This invention relates to computer based communication systems such as the Internet and more particularly to systems and methods for mitigating denial of service (DOS) attacks on such systems.

BACKGROUND

Computer based communication systems and in particular the Internet are vulnerable to various types of security attacks. Included in such attacks are denial of service attacks in which one or more nodes in the system become congested because of excess traffic. In this regard a denial of service attack involves blocking somebody's ability to use some service on a network. Denial-of-Service (DoS) attacks are common across the Internet with many being launched daily at various targets. Many of the attacks involve specially constructed packets designed to either take advantage of flaws in software, or to tie up resources within devices. These are known as packet flooding attacks.

For some packet flooding attacks, especially bandwidth exhaustion, the victim is powerless to mitigate the attack. The victim can implement mechanisms to prevent system crashes, but for example in the case of a bandwidth attack, cannot receive any legitimate traffic.

In any event, considerable effort has been and continues to be devoted to methods and systems for mitigating DOS attacks. In order to implement mitigation measures against an attack, the measures must be implemented upstream from the victim at a point where the attack traffic consists of less than 100% of the incoming data. A typical method of reacting to an attack for a packet flood victim would be to contact the network provider out-of-band and if possible, institute a blocking rule to drop the attacker's traffic, if this indeed is possible.

For an in-band request to be sent to an upstream network provider, the victim must be able to prove an authenticity of this request to the provider. Otherwise a malicious user could cause denials of service simply by requesting a router to block certain addresses. Prior art solutions to the problem require a keyed messaging scheme which may possibly require a Public Key Infrastructure to manage.

In a publication by Mahajan, Ratul entitled "Controlling High Bandwidth Aggregates in the Network", AT&T Center for Internet Research at ICSI (ACIRI) and AT&T Labs Research, Jul. 13, 2001 a solution is proposed wherein if a host determines that they are under attack, a message is sent to an upstream router requesting that some mitigating policy be implemented. In this scheme congestion signature is generated and passed to the router for blocking purposes.

In such systems where a victim must contact an upstream router to request a mitigation mechanism, the victim must be able to prove their identity to the router. Otherwise, as discussed above, a malicious user could request mitigation mechanisms for users operating normally and produce a denial-of-service attack.

To combat this, prior art solutions require an authentication mechanism between users and their upstream routers. For ICMP traceback, a digital signature is used. For the number of users that are typically involved (too many for "shared secret" keying) a commonly proposed solution is an implementation of a Public Key Infrastructure. PKIs are not simple to implement and require significant resource overhead.

SUMMARY OF THE INVENTION

In the present invention there is presented a solution to allow the victim of a packet flooding attack to request that a mitigation mechanism be initiated using an in band channel with light authentication which does not have to be a public key infrastructure. The solution presented here takes a different approach to mitigating packet flooding attacks. Whereas prior art solutions require the victim to request mitigation mechanism be enabled by the upstream router the upstream router in this solution suggests mitigation measures to the victim. The victim can then choose to approve or disapprove the suggested remedies.

Therefore in accordance with a first aspect of the present invention there is provided a method of mitigating a Denial of Service (DOS) attack on a first node in a computer-based communications network comprising the steps of: detecting at a second node located upstream of the first node a traffic pattern indicating a possible DOS attack on the first node; sending from the second node to the first node a notification of the possible attack; and implementing, at the second node, attack mitigation measures to mitigate the attack on the first node.

In accordance with a second aspect of the present invention there is provided a method of mitigating a Denial of Service (DOS) attack on a first node in a computer-based communications network comprising the steps of: detecting at a second node located upstream of the first node a traffic pattern indicating a possible DOS attack on the first node; sending from the second node to the first node a notification of the possible attack; receiving at the first node the notification and determining whether attack mitigating measures should be implemented; if attack mitigation measures are to be implemented sending from the first node instruction to the second node to implement the measures; and implementing the attack mitigation measures at the second node.

In accordance with a further aspect of the present invention there is provided a system for mitigating a Denial of Service (DOS) attack on a first node in a computer-based communications network comprising: a second node located upstream of the first node for detecting a traffic pattern indicating a possible DOS attack on the first node; means for sending from the second node to the first node a notification of the possible attack; and means in the second node to implement an attack mitigation measure to mitigate a DOS attack on the first node.

In accordance with a further aspect of the present invention there is provided a system for mitigating a Denial of Service (DOS) attack on a first node in a computer-based communications network comprising: means in the first node for receiving information from a second node located upstream of the first node indicating a possible DOS attack on the first node; means in the first node for determining whether the information is valid; and means for responding to the second node with instructions regarding attack mitigating measures.

BRIEF DESCRIPTION OF THE DRAWINGS

The invention will now be described in greater detail with reference to the attached drawings wherein:

FIG. 1 illustrates a typical router scenario;

FIG. 2 illustrates the scenario wherein a possible attack is detected and a message is sent to the victim;

FIG. 3 illustrates the scenario where the message is acknowledged and a solution presented to the router; and FIG. 4 shows the new policy implementation wherein the traffic is temporarily halted to the victim.

DETAILED DESCRIPTION OF THE INVENTION

As illustrated in the figures the present invention contemplates an environment in which the router 12 at the edge of the Internet directs traffic to individual stations 14 as is well known in the art. In the present implementation, unlike the prior art, the router 12 is provisioned with means to analyze the flow to each downstream node and to detect a change in traffic pattern which might indicate that an attack is in progress. If an attack is detected a message such as an are you ok (RUOK) query message is sent by the router to the potential victim. This is illustrated in FIG. 2. The victim can either accept that an attack is in progress or may opt to perform its own evaluation to determine if the message is valid. If it is valid it can either present to the router an attack mitigating remedy or simply instruct the router to implement a known measure. In either event, upon receipt of the message by the router the appropriate action is taken.

The solution provided by the present invention are designed specifically to mitigating packet flooding attacks. Whereas prior art solutions require the victim to request a mitigation mechanism be enabled by the upstream router, in the present invention the router suggests solutions to the victim.

To implement this solution, the upstream router analyzes the traffic passing through it for any malicious or suspicious data. Also, the router examines the resource usage for each of the output ports. If any abnormality is detected, a query message (RUOK) documenting the anomaly is sent from the router to the possible victim. The message could contain a random nonce or other authentication information that would allow the router to correspond to any replies to the RUOK message with the original query. This also makes it more difficult for a malicious attacker to spoof the identity of the victim, or to initiate random mitigation upon hosts connected to the router.

If the router is able to isolate a cause, the RUOK message may contain a suggested action to remedy the situation. This might include blocking rules or forms of rate limiting. Otherwise the RUOK message will simply contain a notification of the suspicious behaviour.

Hosts i.e. downstream node, can optionally choose to respond to the RUOK protocol messages. A RUOK reply would consist of the required remedy to be implemented and the length of time for the remedy to remain in place. The length of time should be finite. If any authentication information was used in the original message, it must be included in the response. Hosts not implementing the RUOK protocol or that choose to ignore the message, will not see any changes in traffic policy.

The simplest implementations by the host would simply approve or deny the suggested remedy from the router. More sophisticated implementations might involve a scan of open ports, required resources, etc. Using the information gained through self-analysis, the host can then modify, if necessary, or even reject, the remedy suggested by the router.

Upon receiving a reply from the host, the router checks the nonce. If the nonce is acceptable, then the actions within the reply message are implemented for the specified period of time.

It is also possible to use this method to exchange router-to-router messages as well. For example, a core router that detects an attack on one of its interfaces could send a RUOK query to an edge router. If the edge router detects an attack either through further RUOK queries, or through self-analysis, it can request mitigation mechanisms be put in place by the core router.

One advantage of this method is the fact that public key infrastructure technology is not required. The authentication mechanism is very lightweight (nonce) yet still limits abuse of the system by malicious users, due to the fact that the router actually initiates the process. A system must be under attack, or at least suspected to be, before any messages can be exchanged between routers and victims.

In prior art systems, the victims are assumed to be capable of determining the appropriate actions to take when found to be under attack, but in some cases they may not have the knowledge or resources required to make the decision. In this solution, highly intelligent routers can make expert suggestions to the host as to reaction mechanisms for an attack. In the situation wherein the host does have a more effective response to an attack, it is still free to modify the suggestion from the router to better fit its needs.

This is an advantage to the providers of network connectivity as they can allow the end user to be responsible for enabling or disabling any mitigation methods within the router.

Although authentication method suggested here is not as strong as would be provided by using a PKI, the large resource overhead required for PKI still makes nonce authentication "good enough" for this application.

If the router does not recognize an attack passing through it, no mitigation mechanism can be enabled as no query message will be sent to the victim. In this case, the victim is in no better or worse shape than they were without the mechanism.

It is also possible that the router falsely recognizes an attack passing through and sends a query message to the suspected victim. In this case a simple host implementation may approve the suggested remedy and may end up denying legitimate users access. More sophisticated host implementations may be able to override the suggested actions and thus prevent this problem.

Although particular embodiments of the invention can be described and illustrated it will be apparent to one skilled in the art that numerous changes can be made without departing from the basic concept of the invention. It is to be understood, however, that such changes will fall within the full scope of the invention as defined by the appended claims.

The invention claimed is:

1. A method of mitigating a Denial of Service (DOS) attack on a first node in a computer-based communications network comprising the steps of:
   a) detecting at a second node located upstream of the first node a traffic pattern indicating a possible DOS attack on the first node;
   b) sending from the second node to the first node a notification of the possible attack;
   c) implementing, at the second node, attack mitigation measures to mitigate the attack on the first node; and d) wherein the notification from the second node includes a random nonce or other authentication information with which to verify the response of the first node.

2. The method as defined in claim 1 wherein the second node awaits input from the first node before implementing an attack mitigation measure.

3. A method of mitigating a Denial of Service (DOS) attack on a first node in a computer-based communications network comprising the steps of:
   a) detecting at a second node located upstream of the first node a traffic pattern indicating a possible DOS attack on the first node;
   b) sending from the second node to the first node a notification of the possible attack;
   c) receiving at the first node the notification and determining whether attack mitigating measures should be implemented;
   d) if attack mitigation measures are to be implemented sending from the first node instruction to the second node to implement the measures;
   e) implementing the attack mitigation measures at the second node; and
   f) wherein the notification from the second node includes a random nonce or other authentication information with which to verify the response of the first node.

4. The method as defined in claim 3 wherein the notification from the second node includes a suggested attack mitigating measure.

5. The method as defined in claim 3 wherein the response from the first node to the second node includes an attack mitigating measure.

6. The method as defined in claim 5 wherein the response from the first node to the second node includes a duration of implementation of the mitigating measure.

7. The method as defined in claim 3 wherein the second node analyzes traffic passing through it to detect traffic patterns that indicate a possible DOS attack.

8. The method as defined in claim 7 wherein the second node examines resource usage for its output ports to detect traffic patterns that indicate a possible DOS attack.

9. The method as defined in claim 3 wherein the first node determines whether an attack mitigation measure should be implemented by scanning its input ports for required resources and if they are excessive instructing the second node to implement the measure.

10. The method as defined in claim 9 wherein the type of measure implemented by the second node is based on the nature of the DOS attack.

11. A system for mitigating a Denial of Service (DOS) attack on a first node in a computer-based communications network comprising:
    a second node located upstream of the first node for detecting a traffic pattern indicating a possible DOS attack on the first node;
    means for sending from the second node to the first node a notification of the possible attack;
    means in the second node to implement an attack mitigation measure to mitigate a DOS attack on the first node; and
    wherein the notification from the second node includes a random nonce or other authentication information with which to verify the response of the first node.

12. The system as defined in claim 11 wherein the second node includes means to receive instructions from the first node regarding an attack mitigation measure.

13. A system for mitigating a Denial of Service (DOS) attack on a first node in a computer-based communications network comprising:
    means in the first node for receiving information from a second node located upstream of the first node indicating a possible DOS attack on the first node;
    means in the first node for determining whether the information is valid;
    means for responding to the second node; and
    wherein the notification from the second node includes a random nonce or other authentication information, with which to verify the response of the first node.

14. The system as defined in claim 13 wherein the first node provides information regarding an attack mitigating measure.

* * * * *